(No Model.) 5 Sheets—Sheet 1.

W. G. READ.
MACHINE FOR CRACKING AND SEPARATING ALMOND NUTS.

No. 504,244. Patented Aug. 29, 1893.

Witnesses:

Inventor:
Walter G. Read
By Edson Bro's,
Att'ys.

(No Model.) 5 Sheets—Sheet 2.
W. G. READ.
MACHINE FOR CRACKING AND SEPARATING ALMOND NUTS.
No. 504,244. Patented Aug. 29, 1893.

Witnesses:
Inventor:
Walter G. Read
By Edson Bros,
Atty's.

(No Model.) 5 Sheets—Sheet 3.

W. G. READ.
MACHINE FOR CRACKING AND SEPARATING ALMOND NUTS.

No. 504,244. Patented Aug. 29, 1893.

Witnesses:

Inventor:
Walter G. Read
By Edson Bros,
Attorneys.

(No Model.) 5 Sheets—Sheet 5.
W. G. READ.
MACHINE FOR CRACKING AND SEPARATING ALMOND NUTS.

No. 504,244. Patented Aug. 29, 1893.

Witnesses:

Inventor:
Walter G. Read
By Edson Bro's
Attorney's.

UNITED STATES PATENT OFFICE.

WALTER G. READ, OF COLUSA, CALIFORNIA.

MACHINE FOR CRACKING AND SEPARATING ALMOND-NUTS.

SPECIFICATION forming part of Letters Patent No. 504,244, dated August 29, 1893.

Application filed February 19, 1892. Serial No. 422,146. (No model.)

*To all whom it may concern:*

Be it known that I, WALTER G. READ, a citizen of the United States, residing at Colusa, in the county of Colusa and State of California, have invented certain new and useful Improvements in Machines for Cracking and Separating Almond-Nuts; and I do hereby declare the following to be a full, clear, and exact description of the invention, such as will enable others skilled in the art to which it appertains to make and use the same.

My invention relates to a machine for hulling, cracking, separating and cleaning almond nuts; and the primary object of the invention is to provide novel and simple means whereby the outside hull of the almond nut may be removed, or the hull and shell may be cracked or broken and the kernel or edible substance removed from the hull and shell, the particles of shell being thoroughly removed from the almond kernel or substance during the operation of passing the nuts through the machine.

It is well known that almond nuts have an outside shell or hull which can be removed, except in certain kinds of nuts technically termed "stick tights," and thus permit the kernel to be retained within an interior shell. I aim to provide means whereby the outside hull can be cracked and separated from the nut consisting of the interior shell and the kernel or edible substance; or if desired, the outside hull and the interior shell can be cracked to free the kernel or edible substance, and the latter thoroughly separated from the hull and shell, as may be found most desirable.

Having thus given a general statement of the object of my invention, I will now proceed to a detailed description of the preferred embodiment of the machine for carrying the invention into effect, reference being had to the accompanying drawings, in which—

Like letters and numerals of reference denote corresponding parts in all the figures of the drawings.

Figure 10:
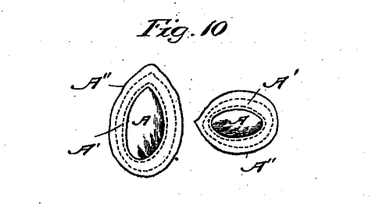
Fig. 10 is a view showing, by transverse and longitudinal section, the form and construction of the almond nut.

In Fig. 10 I have illustrated, for the sake of clearness, the form of an almond nut, as well as the structure of the same. As will be seen by reference to the drawings, the nut is of the form of an oblate spheroid in both longitudinal and transverse section; and the edible substance or kernel A of the nut is inclosed within a shell A', indicated by dotted lines, which shell in turn is inclosed within an outside hull, A".

Figure 5:
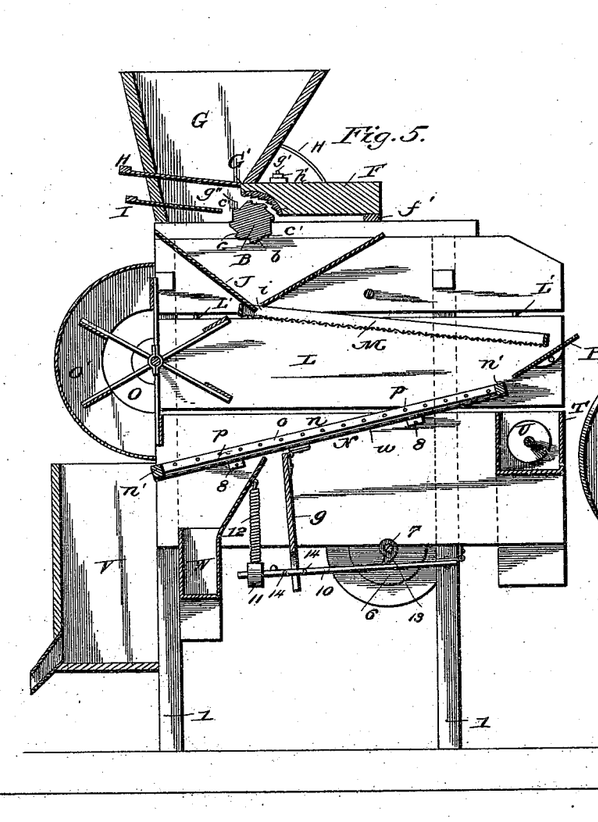
Fig. 5 is a vertical longitudinal sectional view taken through the machine on the plane indicated by the dotted line $x\ x$ of Fig. 4.
Figure 6:
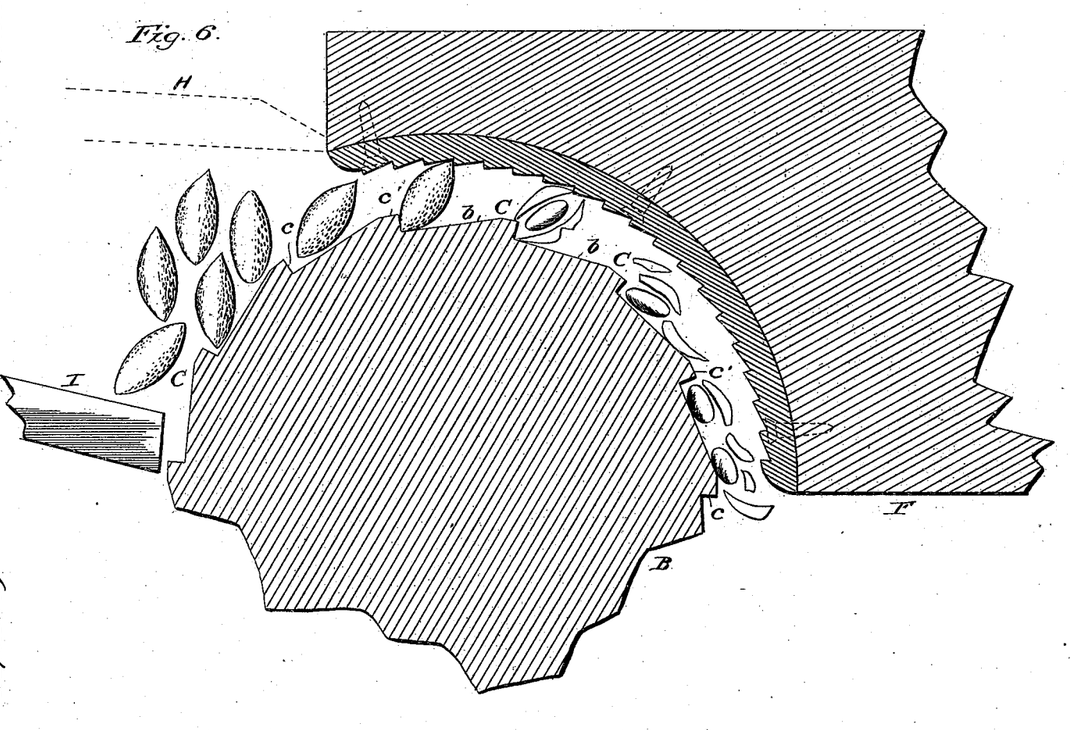
Fig. 6 is a detail view, on an enlarged scale, through a portion of the cylinder and the concave, showing the course and position of the almond nuts while passing between the cylinder and concave.

As heretofore stated, I provide a cylinder and concave, which by proper adjustments, can be so regulated that the outside hull A" can be cracked and removed from the interior shell, or both the outside hull and the interior shell may be broken and the kernel or edible substance separated from the hull and shell. To accomplish these ends in the treatment or manipulation of an almond nut which has the form shown in the drawings, I provide the concave and cylinder with peculiar forms of teeth which are placed in reverse positions or order. The cylinder B is provided with a continuous series of teeth C, which are spaced equi-distant around the surface of the cylinder, and which extend entirely across the face of the cylinder in straight parallel lines. Each tooth C has the long side $b$ lying tangential to the cylindrical surface of the cylinder, the short radial side $c$, and the abrupt faces $c'$ which join the long tangential side $b$ with the short radial side of the tooth, as more clearly shown in Fig. 5 of the drawings. The teeth of the concave are arranged in regular parallel series, across the face of said concave, and they are finer and arranged closer together than the teeth of the cylinder, so that the concave has a larger number of teeth relatively to the teeth of the cylinder. The teeth of the concave are inclined in the reverse direction or order of the teeth on the cylinder, so that as the cylinder turns slowly the nuts will be carried around with the cylinder and will catch or take against the teeth of the concave, as indicated in Fig. 5, which results in breaking the outside hull if the concave is adjusted or placed away from the cylinder the proper distance, or if the concave is adjusted closer to the cylinder, the hull and inside shell of the nut will be crushed and broken between the teeth of the cylinder and concave, thus separating the pit or kernel from the shell.

Figure 7:
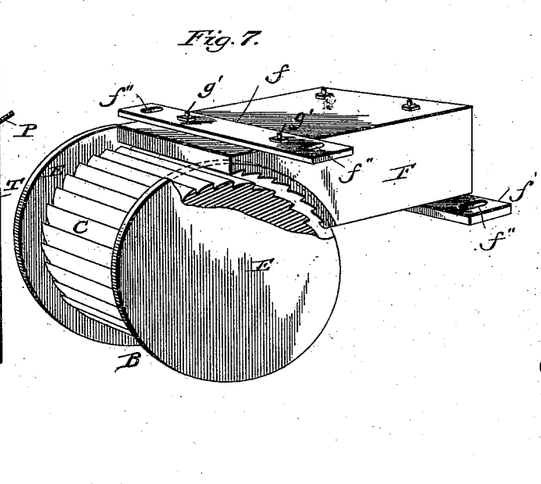
Fig. 7 is a detail view, in perspective, of the cylinder and concave, part of the cylinder being broken away.

By reference to the drawings it will be noted that the concave is arranged opposite to the upper part or half of the cylinder, which is an important arrangement in a machine especially designed for cracking almond nuts. It is evident that if the concave extended around the cylinder for some distance below the horizontal center of the same, the edible substance or pits would be liable to be crushed between the teeth of the cylinder and concave; but by arranging the concave so that its lower end terminates at or near the horizontal center of the cylinder and the concave lies opposite to the upper half of the cylinder, I am enabled to avoid crushing and destroying the pits or kernels because the latter fall by gravity against the cylinder and drop between the teeth thereof so that the pits are carried around with the cylinder, close against the surface of the same, and are not crushed or broken. The cylinder is of equal width to the concave, or somewhat longer, and at its ends said cylinder is provided with annular flanges or rims E, E, which project a suitable distance beyond the faces of the teeth so that the said flanges are adapted to bear against the sides of the concave and prevent the nuts from escaping between the cylinder and concave. This concave is preferably made of metal, and it is secured in any suitable way to the concave face of an adjusting block or support F. This support is preferably of wood, although it may be made of metal in skeleton form as is obvious to a skilled mechanic, and said support is provided with laterally extending lugs or arms $f, f'$, which may be made integral with the support or by means of the transverse wooden bars shown in Fig. 7, the ends of which bars protrude from the sides of the support. These arms or lugs are each provided with a transverse slot or opening, $f''$; and the bars $f$ (or arms) are located at the upper inner corners of the support while the other bars or arms $f'$ are at the outer lower corners of the support. The arms $f'$ are secured to the main framing of the machine by bolts $g$, while the inner upper arms $f$ are secured to the main framing by suitable bolts $g'$ which are longer than the bolts $g$, the bolts $g'$ being secured in the boxes or bearings of the cylinder shaft and provided with nuts $h$, $h'$, above and below the arms $f, f'$, so that the inner end of the concave and its support can be raised as well as adjusted to or from the surface of the cylinder.

By providing means whereby the support and concave can be moved toward or from the cylinder, as well as raised or lowered somewhat at the inner end thereof, I am enabled to adapt the cylinder and concave to the work of removing the outside hull, or to breaking both the outside hull and interior shell, and to enable the same to operate successfully upon nuts of different sizes, for which latter purpose the inner and lower part of the concave is brought closer or nearer to the surface of the cylinder than at the upper receiving part of the concave, thus lessening the width of the space between the parts at the lower end of the concave.

I will now proceed to describe the general construction of the machine, including the means for supporting the cylinder, bringing the nuts thereto, separating the hull from the nut and the pit or kernel from the hull and shell.

Figure 1:
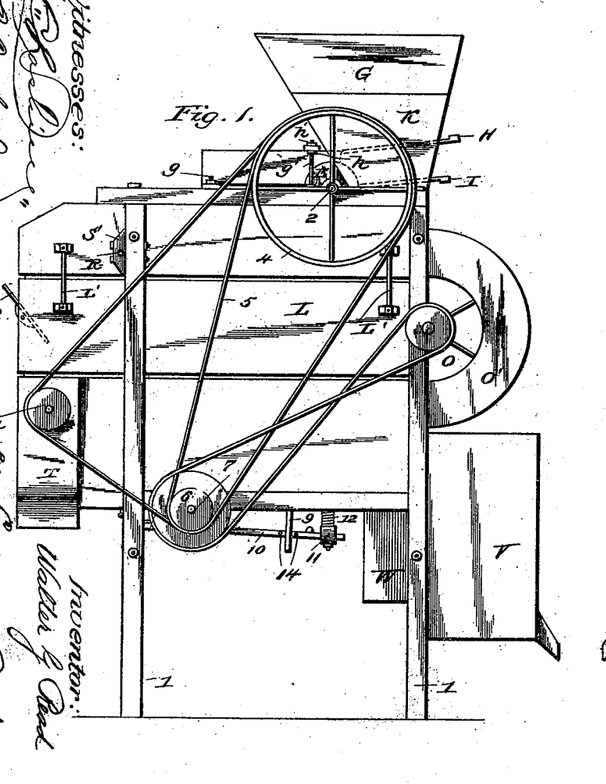
Figure 1 is a side elevation taken from one side of the machine.
Figure 2:
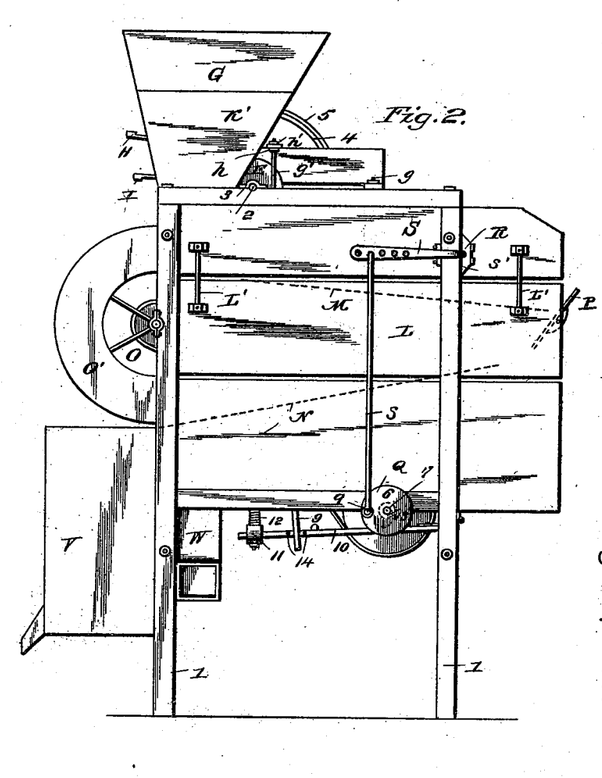
Fig. 2 is a similar view taken from the opposite side of the machine.
Figure 3:
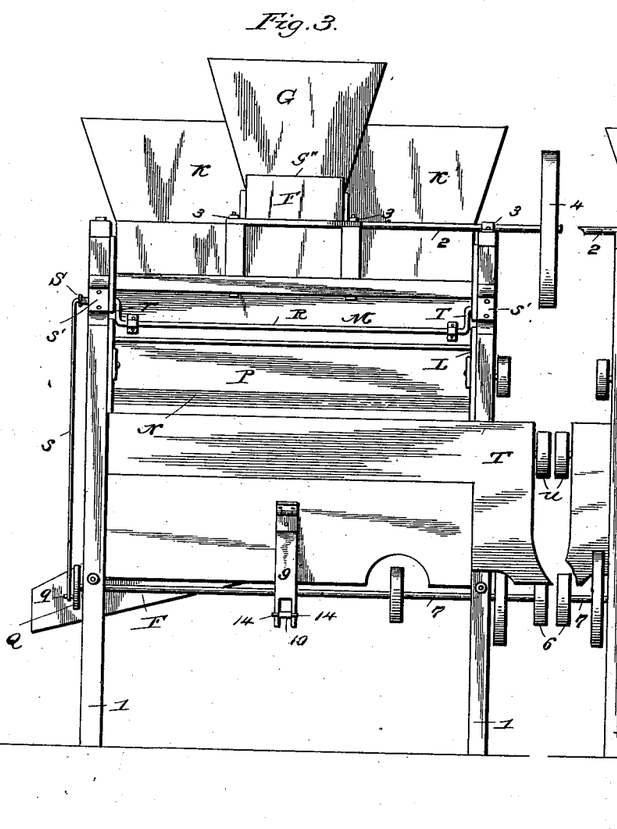
Fig. 3 is an elevation looking at the front.
Figure 4:
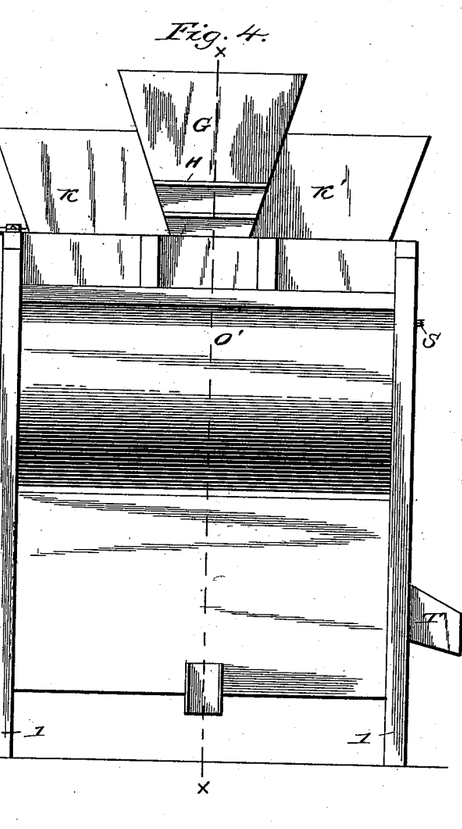
Fig. 4 is another elevation looking at the rear of the machine.

The frame, proper, consists of suitable uprights 1 joined and bolted to suitable transverse pieces; and upon the upper part of the frame is the primary receiving hopper G having the inclined or converging sides and the closed ends. In one of the inclined sides of this primary hopper is formed an opening G' in which operates the cylinder; and to one side of the cylinder is the adjustable cut-off slide H which operates across the bottom of the hopper and serves to regulate the quantity of nuts fed to the cylinder. The cylinder is mounted on or carried by a horizontal shaft, 2, which has three bearings, 3, one of which is secured to one of the cross pieces of the main frame and the other bearings are located on opposite sides of the primary receiving hopper G. The end of the shaft protrudes beyond the bearing on the cross bar of the main frame, and said protruding end of the shaft carries a pulley, 4, which is driven by a belt 5 from a similar pulley 6 on one end of the main driving shaft of the machine, said driving shaft being journaled in suitable bearings in the lower rear part of the machine, as shown in Figs. 1, 2, and 3.

Below the cut-off slide in the hopper, is the inclined feed board I which is supported in any suitable way in the hopper so that it can be moved toward or from the cylinder; and after the nuts fall through the space between the slide H and the side of the hopper, they are deposited on the inclined feed board I, from which board the teeth of the cylinder carry the nuts to the concave.

Within the inclosure of the main frame, and immediately below the hopper and the cylinder and its concave, I provide the interior chute J which receives the nuts and hulls and shells and pits after they have been operated upon between the cylinder and concave. This interior chute is provided, in the apex formed by the converging sides, with a discharge opening, $i$, from which the contents of the chute pass through and are deposited upon the screen of the shaking shoe, L, presently described.

Figure 8:
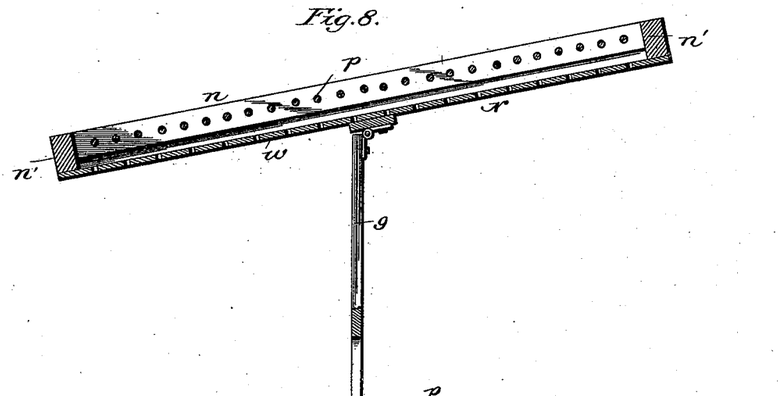
Fig. 8 is a detail longitudinal sectional view of the riddle in the shaking shoe.
Figure 9:
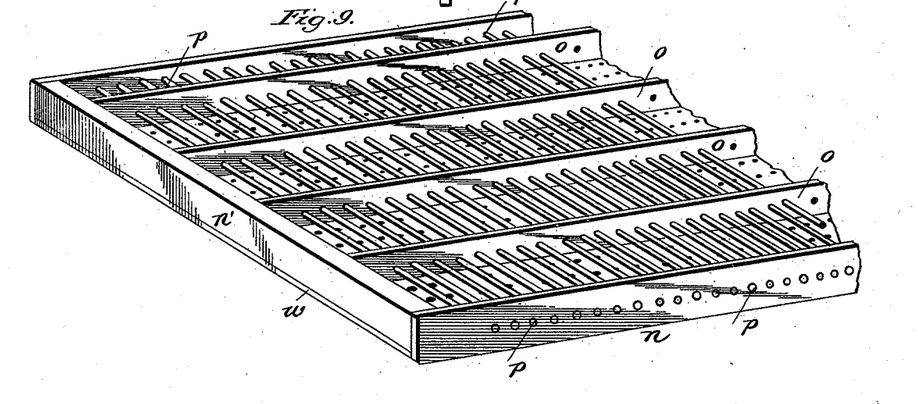
Fig. 9 is a view, in perspective, of part of the riddle showing the form and arrangement of the longitudinal strips and transverse wires of the same.

Above the main frame of the machine, and on opposite sides of the primary receiving hopper, are the auxiliary hoppers, K, K', which are separate or independent of the primary hopper. The interior chute J extends entirely across the machine frame, on the inner side thereof, and it receives not only from the primary hopper but also from the auxiliary hoppers K, K', as shown. By closing the cut off slide H so that the nuts in the hopper G cannot pass to the cylinder, it is evident that other substances can be placed in the auxiliary hoppers, and fed through the interior chute to the shaking shoe of the machine; or if it is desired to clean the almond kernels and further separate them from the hulls and shells, without subjecting the same to the action of the cylinder and concave, said almonds can be placed in the auxiliary hoppers and thus passed into the shoe and through the machine. The shaking shoe L extends across the machine, and it is suspended or supported by means of the four links, L', arranged on the outside of the frame and pivotally connected to the frame and shoe so that the latter can move or vibrate back and forth in the main frame. In the upper part of this shaking shoe I arrange a large meshed screen M which is inclined downwardly toward the rear end of the shoe, and below the screen is the trough-sieve N, shown more clearly in Figs. 8 and 9 of the drawings. This trough sieve is inclined in the reverse direction to the inclination of the screen M and it extends in a downward direction from the rear end of the shoe toward the front end of the same, see Fig. 5. This sieve consists of a suitable rectangular outside frame $n$, having a cross bar $n'$; a series of longitudinal bars, $o$, which are arranged parallel with each other and suitably secured to the end bars of the frame, $n$; and the transverse wires $p$ which are passed through the longitudinal bars and suitably secured thereto or to the outside frame, $n$, of the sieve. By this construction of the sieve I am enabled to permit the kernels or pits to pass over the sieve while the heavy, comminuted, fine particles of shell or hull pass through the wires. At the same time, the longitudinal bars, $o$, $o$, serve as troughs to properly conduct the pits or kernels along the sieve and to the receptacle.

The contents of the shoe are subjected to a blast of air from a blower or fan O which is inclosed within a suitable casing O' secured on the front of the machine frame.

At the tail or rear end of the shoe, and between the contiguous ends of the screen and sieve, I provide a tail or blast gate P which is arranged in an inclined position and which can be adjusted to vary its inclination, the tail board being held in position in any suitable way. When the incline is adjusted for removing the hulls from the shells, all substances and particles of shells lighter than the unhulled almonds (as some of the nuts will pass between the cylinder and concave without being hulled) are blown over the tail gate and the hulled almond and unhulled almonds or "stick tights" drop from the tail gate into the conveyer receptacle.

When the machine is adapted for cracking almond nuts, all light substances are blown over the tail gate while the half cracked almonds and the heavy pieces of hull and shell drop into the conveyer-receptacle; and in no case does anything drop from the tail gate onto the lower screen, as the blast from the fan will not permit this to be done, but they are forced into the conveyer. The pits and small heavy pieces of shell and hull are the only parts that reach the lower sieve. The purpose of this tail gate is to save nuts and pits when the running or speed of the machine is irregular or uneven, and when the speed is just right the over flow strikes the gate about midway; if the speed is too fast, the overflow strikes the upper edge of the gate and the nuts are precipitated downward into the conveyer receptacle and thereby saved; if the speed is not fast enough, the overflow will strike near the lower edge of the gate and the lighter substances will be blown or worked up and over the edge of the gate.

The shoe is kept in a state of constant agitation by devices actuated by the main driving shaft 7 of the machine. The mechanism for imparting the reciprocating motion to the shoe consists of a crank disk Q fixed to one end of the shaft 7 and having the wrist pin, $q$, a rock-shaft R journaled in suitable bearings on the machine frame and having cranks $r$ formed thereon, a perforated horizontal arm S fixed to one end of the rock shaft, and a connecting rod or pitman $s$ which is pivoted on the wrist pin of the crank-disk and connected to the horizontal arm S by means of a bolt which passes through one of the perforations in said arm. The rock-shaft is connected by clips or any other suitable means, $s'$, to the end of the shoe, and as the crank-disk is rotated the pitman vibrates the arm S which in turn moves the rock-shaft R in its bearings, thus giving to the shoe a back and forth movement across the machine frame. The lower sieve N of the shoe is not rigidly attached or fastened to the frame of the shoe; the upper end of said sieve is connected to the shoe so that the sieve will partake of the back and forth movements of the shoe while at the same time the lower end of the sieve is capable of a limited vertical movement or play, said lower end of the sieve-frame $n$ resting on stationary ledges or supports 8, 8, which are secured to the inside of the inclosure of the main frame of the machine.

The lower sieve of the vibrating shoe is moved vertically for a limited distance by the following means: To the cross bar n' of the frame n of the sieve is hinged or pivotally connected a depending bar or support 9 which is bifurcated or forked at its lower end; and said bifurcated end of the depending bar fits over a striker-lever 10 arranged in a horizontal position and pivoted at one end to one of the cross bars of the main frame of the machine. This striker-lever has a weight 11 at its free end, and said end is connected by a retractile spring 12 to a fixed board of one of the discharge chutes of the machine. This spring acts to normally raise the striker-lever and hold it in contact with a detent or cam 13 on the main driving shaft of the machine, and when the shaft rotates the cam operates to depress the striker-lever until it frees or clears itself from the lever, whereupon the spring reacts and suddenly raises the lever which imparts an impulse to the depending bar sufficient to raise the sieve N slightly and operate to clear the same from adhering pieces of shells and hulls. The lower bifurcated end of the depending bar 9 straddles the striker lever 10 as shown in Fig. 5; and as the bar 9 is pivotally connected to the sieve of the reciprocating shoe, it is necessary to loosely confine the lower end of said bar 9 on the striker lever in order to permit the sieve to vibrate and to hold the bar on the striker-lever in operative position to impart to the sieve the vertical impulses or vibratory motion. This is effected by providing the studs or pins 14, 14, on the striker-lever on opposite sides of the lower forked end of the depending bar, and these pins serve to retain the bar on the striker-lever to prevent it from moving out of position thereon while partaking, to a limited extent, of the vibrating motion of the sieve connected to the shaking shoe, as will be understood.

Below the rear end of the vibrating shoe, and the adjustable tail gate thereof, I arrange a fixed receptacle T to receive from the screen M of the shoe, and in this receptacle is located a screw-conveyer U, having one end of its shaft extended beyond the receptacle and provided with a pulley u which is driven by the belt 5 that passes around the pulleys on the main driving shaft and the cylinder-shaft, as indicated in Fig. 1 of the drawings.

At the other end of the machine, (the front end,) and below the fan-casing O', is another receptacle V which is also arranged beneath the shoe to receive from the sieve N of the shoe. This receptacle receives the cleaned kernels which have been separated from the shells and hulls of the nuts. To one side of this receptacle V is arranged a chute W, which lies within the machine frame and receives the fine particles of shell and dirt, &c., that fall through the wire meshes of the sieve upon a plate w which is secured to the sieve frame n below the wires and the longitudinal bars of said sieve.

This being the construction of my machine, the operation thereof may be described as follows: If it is desired to separate the hulls from the interior shells of the nuts, and thus allow the shells and pits to remain intact, the concave is adjusted a suitable distance away from the cylinder, and the nuts are placed in the primary receiving hopper. After the main driving shaft has been started, the cut-off slide is drawn outwardly a suitable distance to permit the nuts from the hopper to drop upon the feed board, from whence the nuts are taken by the teeth of the cylinder and carried by the latter to the concave, where the nuts are cracked sufficiently to permit the hulls to be removed. After the hulls and the shells containing the kernels have passed between the cylinder and concave, they are deposited upon the interior chute and thence upon the screen M of the shoe. The shells and kernels contained therein pass along the screen M and are deposited, owing to their greater specific gravity, into the receptacle T from whence they are discharged by the screw-conveyer, while at the same time the lighter particles of hulls are blown over the tail gate by the blast of air from the blower and the small heavier pieces of hull are deposited on the sieve and thence discharge from the machine. If, however, the nuts are of the class known as stick-tights, and the outside hull cannot be readily separated or removed from the interior shell, the concave is adjusted closer to the cylinder, and the nuts are cracked by the cylinder and concave, only the kernel or edible substance remaining intact. The hulls, shells and kernels are passed to the interior chute, thence to the screen M of the shoe where the lighter particles of shells, hulls, &c., are blown over the tail board. The heavier pieces of shell and hulls are deposited in the receptacle T, while the kernels and smaller pieces of hulls and shells drop through the screen M and are deposited on the sieve, along which they are carried, the kernels to the receptacle V at the end of the shoes while the particles of shells and hulls, and the comminuted shells and hulls pass through the wires of the sieve and are deposited in the inclined chute W. If it is desired to pass half-cracked nuts, after their removal from the receptacle T, again through the machine, they can be placed in the primary receiving hopper and again subjected to the action of the cylinder and concave; but if it is desired to effect a more thorough separation of the kernels from the shells and hulls, should the latter become mixed with the kernels, the whole can be placed in the auxiliary hoppers and again passed through the shoe without being subjected to the action of the cylinder and concave.

Having thus fully described my invention, what I claim as new, and desire to secure by Letters Patent of the United States, is—

1. In a machine for cracking or hulling almond nuts, the combination of a cylinder having a series of transverse teeth on its surface, each tooth provided with a straight surface between its tangential and radial sides, and a concave adjustably secured in fixed relation to the cylinder and having on its inner surface a series of teeth arranged in reverse order to the teeth of said cylinder, said cylinder being continuously rotated in one direction to present the abrupt radial sides of its teeth to the corresponding sides of the teeth on the concave, for the purpose described, substantially as set forth.

2. In a machine for cracking or hulling almond nuts, the cylinder having its teeth arranged parallel across its surface and each tooth provided with the straight surface between its tangential and radial sides, combined with a concave having a greater number of teeth than the cylinder and with its teeth arranged in reverse position to the teeth of the cylinder, said cylinder being rotated continuously in one direction to present the radial sides of its teeth to the corresponding sides of the teeth on the concave, for the purpose described, substantially as set forth.

3. In a machine for cracking or hulling and separating almond nuts, the combination with a main frame, and a primary receiving hopper, of the fixed concave situated within the hopper at one side thereof and provided with the transverse teeth on its inner surface, the cylinder having its teeth arranged in reverse order to the teeth on the concave and rotated in a direction to present the abrupt sides of its teeth to the corresponding sides of the teeth on the concave, a shaking shoe below the cylinder and concave, the movable cut off H situated in the hopper above the cylinder and concave, and the regulating slide I guided in the hopper below the cut-off and arranged opposite to the cylinder, substantially as and for the purpose described.

4. In a machine for cracking and separating the hulls and shells of almond nuts, the combination with a main frame or casing and a hopper, of the adjustable supporting block secured to the casing outside of the hopper and having its inner end fitting in an opening in the side of said hopper, the toothed concave fixed to the inner end of said support, and the toothed cylinder provided at its ends with the circumferential flanges or heads which project beyond the cylinder and embrace the sides of the supporting block F and the ends of the concave, for the purpose described, substantially as set forth.

5. In a machine for cracking and separating the hulls and shells of almond nuts, the combination with a main frame and the primary hopper, of the support F situated outside of the hopper and provided, at its opposite ends, with the upper and lower arms, respectively, which project laterally from the support, the independent bolts for securing the support to the main frame to permit said support to be adjusted endwise and vertically, as set forth, the concave fixed to the inner end of the support, and the cylinder within the hopper, close to said concave, substantially as described.

6. In a machine of the character specified, the combination of the primary receiving hopper, the cylinder operating therein, the concave, the auxiliary hoppers on opposite sides of the primary hopper, the interior chute arranged within the casing of the machine framing and common to all of the hoppers to receive from the same, the cut-off operating in the primary hopper only, the inclined feed board in said primary hopper, and the shoe below the interior chute, substantially as and for the purpose described.

7. The combination with a vibrating shoe, of the sieve connected at one end to the shoe to partake of the vibrating motion thereof and resting at its other end on fixed supports independent of the shoe, the driving shaft, the striking mechanism having one part thereof pivotally connected to said sieve, and a cam on the driving shaft to operate the striking mechanism and impart vertical impulses to the sieve independently of its motion with said vibrating shoe, substantially as and for the purpose described.

8. The combination with a vibrating shoe, of the sieve connected to the shoe at one end and having its other end supported by means independent of the shoe, the driving shaft, the striking lever normally held by a spring in contact with a cam on the shaft, and the pendent bar loosely connected to the sieve and to the striking lever, as and for the purpose described.

9. The combination with a vibrating shoe, of the sieve connected at one end to the shoe and having its other end supported by the ledges or shoulders, the shaft having a cam, the striker-lever arranged in the path of the cam, and having its free end connected by a spring to a part of the machine framing, and the pendent bar pivoted to the sieve-frame and having its other end loosely connected to the striker-lever, as and for the purpose described.

10. The combination, in a machine of the character specified, of the primary receiving hopper, the concave and cylinder, the vibrating shoe below the hopper and arranged to receive from the cylinder and concave, the single driving shaft having connections with the shoe to reciprocate the same, the receptacle below the tail of the shoe and having the conveyer therein, and gear connections between the driving shaft, the cylinder shaft, and the conveyer shaft to operate all the parts simultaneously, as and for the purpose set forth.

11. In a machine for cracking or hulling and separating almond nuts, the combination with a hopper, of a cylinder journaled in said hopper, a concave arranged close to the surface of said cylinder and adjustable toward or from the same, for the purpose described, and the shaking shoe L arranged immediately below said cylinder and concave to receive directly therefrom, said shoe carrying the inclined sieve M and the screen N which is inclined reversely to the sieve, substantially as and for the purpose described.

12. In a machine for cracking and hulling and separating almond nuts, the combination, with a hopper of a cylinder B journaled therein, a fixed concave arranged close to said cylinder and adjustable toward or from the same, for the purpose described, the shaking shoe arranged below said cylinder and concave and carrying the reversely-inclined sieve and screen, the tail-gate pivoted to the shoe between the contiguous ends of the sieve and screen, and the blast fan at the opposite end of the shoe from the tail gate, substantially as described.

13. In a machine for cracking and hulling and separating almond nuts, the combination, with a hopper, of the cylinder B journaled therein, a fixed concave arranged close to said cylinder and adjustable toward or from the same, for the purpose described, the shaking shoe L arranged immediately below the cylinder and concave and carrying the reversely inclined sieve and screen, the inclined tail gate P pivoted to the shoe between the contiguous ends of the sieve and screen, a blast fan, and the conveyer U operating in a receptacle below the pivoted tail gate and the upper end of the screen on the shoe, the whole combined and arranged for operation, substantially as described for the purpose set forth.

14. In a machine for cracking and hulling and separating almond nuts, the combination, of a hopper, the rotary cylinder, the concave adjustable toward or from the periphery of the cylinder, the vibrating shoe L arranged to receive from the cylinder and concave, the single driving shaft connected to said shoe to reciprocate the same, the conveyer arranged in a receptacle below the tail of the shoe, and belting between the driving shaft, the cylinder shaft, and the conveyer shaft, for the purpose described, substantially as set forth.

15. In a machine for cracking and hulling almond nuts, the cylinder having a series of ratchet teeth each provided with the inclined and radial sides connected by the tangential surface, said cylinder being rotated continuously in one direction to present the radial sides of its teeth to the corresponding sides of the teeth on a concave, combined with a concave having teeth arranged in reverse order to the teeth on the cylinder, the concave being arranged opposite to the upper half of said cylinder and having its lower edge terminating at or near the horizontal axis of the cylinder, whereby the hulls or shells of the nuts will be crushed between the teeth of the cylinder and concave and the kernels will drop or fall upon the cylinder without liability of being injured by said concave, as and for the purpose described.

In testimony whereof I affix my signature in presence of two witnesses.

WALTER G. READ.

Witnesses:
J. F. READ,
JNO. L. JACKSON.